(12) United States Patent
Cherami et al.

(10) Patent No.: US 11,292,563 B2
(45) Date of Patent: Apr. 5, 2022

(54) METHODS FOR SUBSEA VEHICLES SUPERVISED CONTROL

(71) Applicant: Oceaneering International, Inc., Houston, TX (US)

(72) Inventors: Jami Joseph Cherami, Lafayette, LA (US); Peter Andrew Robert Moles, Cypress, TX (US); Todd Newell, The Woodlands, TX (US); Lance Michael Williams, Morgan City, LA (US)

(73) Assignee: Oceaneering International, Inc., Houston, TX (US)

( * ) Notice: Subject to any disclaimer, the term of this patent is extended or adjusted under 35 U.S.C. 154(b) by 293 days.

(21) Appl. No.: 16/213,761

(22) Filed: Dec. 7, 2018

(65) Prior Publication Data

US 2019/0176944 A1 Jun. 13, 2019

Related U.S. Application Data

(60) Provisional application No. 62/596,809, filed on Dec. 9, 2017.

(51) Int. Cl.
*B63G 8/00* (2006.01)
*E21B 41/04* (2006.01)
*B63J 3/00* (2006.01)

(52) U.S. Cl.
CPC .............. *B63G 8/001* (2013.01); *E21B 41/04* (2013.01); *B63B 2203/00* (2013.01); *B63B 2205/00* (2013.01); *B63B 2209/18* (2013.01); *B63B 2209/20* (2013.01); *B63G 2008/004* (2013.01); *B63G 2008/005* (2013.01); *B63J 2003/003* (2013.01)

(58) Field of Classification Search
CPC .... B63G 8/001; B63G 2008/004; E21B 41/04
See application file for complete search history.

(56) References Cited

U.S. PATENT DOCUMENTS

| | | | |
|---|---|---|---|
| 10,011,352 B1 * | 7/2018 | Dahlstrom | B64C 39/024 |
| 10,054,104 B1 * | 8/2018 | Cote | H02K 7/14 |
| 10,633,115 B2 * | 4/2020 | Pilskalns | B60L 53/126 |
| 2012/0112008 A1 * | 5/2012 | Holifield | B64C 27/02 |
| | | | 244/155 A |
| 2017/0271916 A1 * | 9/2017 | Chance | B63B 21/29 |
| 2018/0189971 A1 * | 7/2018 | Hildreth | A63H 27/12 |
| 2019/0176944 A1 * | 6/2019 | Cherami | B63G 8/001 |
| 2019/0331754 A1 * | 10/2019 | Chedrawy | H04W 4/029 |

* cited by examiner

Primary Examiner — S. Joseph Morano
Assistant Examiner — Jovon E Hayes
(74) Attorney, Agent, or Firm — Maze IP Law, P.C.

(57) ABSTRACT

Multiple systems and methods for providing supervised control of subsea vehicles for offshore asset management as well as supplemental autonomous control behaviors are described herein. These systems and methods provide offshore support and alternative supervised control of one or more vehicle generally irrespective of where the vehicle resides in an oil and gas offshore field.

16 Claims, 1 Drawing Sheet

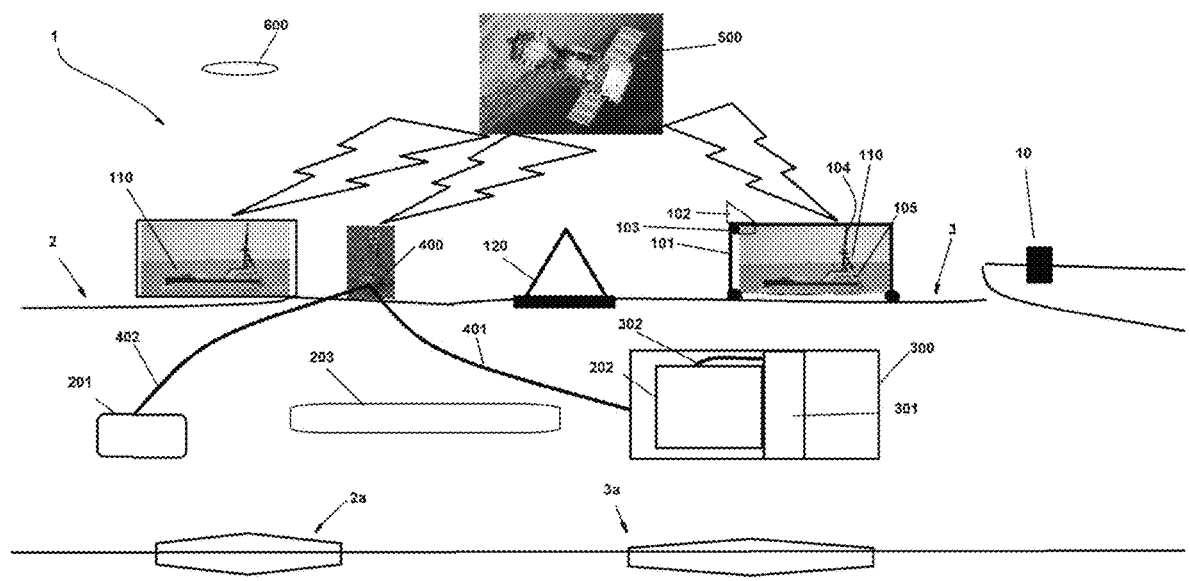

METHODS FOR SUBSEA VEHICLES SUPERVISED CONTROL

RELATION TO OTHER APPLICATIONS

This application claims priority through U.S. Provisional Application 62/596,809 filed on Dec. 9, 2017.

BACKGROUND

Offshore assets require various survey, inspection and intervention tasks to ensure production. Typical tasks can include survey, e.g. of pipeline movement, pipeline CP readings, leakage and seepage monitoring; inspection, e.g. general and detail visual inspections, cleaning, hardware CP readings, riser/pipeline inspection, CP, wall thickness, and the like; and/or intervention, e.g. biologicals and other cleaning, valve operation, and the like.

The majority of such tasks are typically completed using a remotely operated vehicle (ROV) or autonomous underwater vehicle (AUV) deployed from a support vessel. The ROV is controlled by an operator at a control console on the vessel. The AUV operates semi-autonomously as it is monitored by the trailing vessel to ensure positive GPS location and sensor data quality.

Autonomous vehicles, whether operating on the surface or subsea, are still maturing technologies. To deliver capabilities today, and develop trust with the technology, one or more intermediate steps are required. Providing supervisory control requires relaying data/video from the vehicle to a shore location and sending corresponding control commands back to the vehicle. This relay can be provided to the site through singly or with a combination of a fiber in an offshore umbilical, a buoy floating on the surface, an autonomous surface vehicle (ASV) operating on the surface. ASVs are typically connected to the ROV through one or more of a fiber optic tether or fiber in a cable or wireless communications laser, acoustic, or the like.

An issue is typically a lack of sufficient power density to enable a vehicle to launch from shore, transit to the field site, accomplish its tasks, and return to shore, leading to a further issue as to how to deliver the vehicle offshore.

FIGURES

Various figures are included herein which illustrate aspects of embodiments of the disclosed inventions.

FIG. 1 is a schematic view of various embodiments of the system described herein.

DESCRIPTION OF EXEMPLARY EMBODIMENTS

Multiple systems and methods for providing supervised control of subsea vehicles for offshore asset management as well as supplemental autonomous control behaviors are described herein. These systems and methods provide offshore support and alternative supervised control of one or more vehicle generally irrespective of where the vehicle resides in an oil and gas offshore field.

In a first embodiment, referring generally to FIG. 1, system 1 for providing supervised control of a subsea vehicle 200 for offshore asset management comprises renewable energy source 102; charging system 103 operatively in communication with renewable energy source 102; subsea vehicle 200; vehicle delivery system 100; communication link 104; and data transceiver 105 operatively in communication with subsea vehicle 200, vehicle delivery system 100, and communication link 104.

Renewable energy source 102 may be a solar energy power generator or a wind generator or the like or a combination thereof and typically comprises one or more rechargeable batteries. Where a rechargeable battery is present, charging system 103 typically comprises a battery charging system which may further comprise an induction connection.

Communication link 104 may comprise a cellular communication link, a satellite communication link to and from satellite 500, or the like, or a combination thereof.

Data transceiver 105 is typically adapted to relay data between subsea vehicle 200 and a remote location where the data comprise video data, subsea vehicle control commands, or the like, or a combination thereof.

Subsea vehicle 200 is generally dynamically positionable can be an autonomous underwater vehicle (AUV) 201, a remotely operated vehicle (ROV) 202, or the like. If subsea vehicle 200 comprises an ROV 202, system 1 may further comprise tether management system (TMS) 300 and tether 302, where TMS 300 may further comprise a fiber optic tether and a wet-mateable high bandwidth connector operatively connected to and in communication with the fiber optic tether 302.

If subsea vehicle 200 comprises AUV 201, system 1 may further comprise launch and recovery system LARS adapted to interface with AUV 201. ASV 110 may further comprise one or more acoustic communication systems which may be operatively placed in communication with data transceiver 105.

In certain embodiments, system 1 further comprises an aerial drone 600.

System 1 may be tailored for different scenarios. By way of example and not limitation, in a first embodiment, vehicle delivery system 100 comprises autonomous surface vehicle (ASV) 110 which may be deployed from a predetermined launch location. The predetermined launch location may be a pier onshore, floating production storage and offloading unit (FPSO) 120, one or more moored offshore buoy systems 400, or the like, or a combination thereof. If present, ASV 110 may be operatively connected to moored offshore buoy system 400 via an umbilical. Offshore buoy system 400 may comprise a plurality of offshore buoy systems 400 sufficient to provide support for a predetermined field area 2.

In a further embodiment, vehicle delivery system 100 comprises floating production storage and offloading unit (FPSO) 120 and autonomous surface vehicle (ASV) 110 which is deployable from a predetermined launch location. Vehicle delivery system 100 may further comprises launch and recovery system (LARS) 301 which may be launched from a deck on FPSO 120 or left moored close to FPSO 120. Additionally, subsea vehicle 200 may be left moored at a location close to FPSO 120.

In certain embodiments, vehicle delivery system 100 further comprises a moored, floating, covered garage 101 to which subsea vehicle 200 may be moored, where floating, covered garage 101 typically comprises communication hardware to enable docking and undocking, protective storage, and diagnostics for subsea vehicle 200 and act as a platform for vessel maintenance.

In these embodiments, system 1 may further comprise one or more buoy system 400 moored to the seabed; tether management system TMS 300; and umbilical 401 connecting buoy system 400 to TMS 300.

In a further embodiment, vehicle delivery system 100 comprises a large displacement unmanned underwater vehicle (LDUUV) 203 deployed from a predetermined launch location which may comprises a pier onshore or buoy system 400 moored offshore. System 1 may further comprise moored, floating, covered garage 101 to which subsea vehicle 200 is moored where moored, floating, covered garage 101 is as described above.

In the operation of exemplary methods, referring still to FIG. 1, supervised control of subsea vehicle 200 may be provided for offshore asset management using system 1. Generally, vehicle delivery system 100 is deployed from a launch location and vehicle delivery system 100 transited to first predetermined subsea field location 2. Subsea vehicle 200 is also commanded to transit to a first subsea location 2a proximate first predetermined field location 2, typically when vehicle delivery system 100 is at or near first predetermined subsea field location 2. Once at or near first subsea location 2a, subsea vehicle 200 is used to perform one or more predetermined tasks at the first predetermined field location 2. Vehicle delivery system 100 may be transited to second predetermined subsea field location 3 thereafter, and the process repeated.

If system 1 further comprises a TMS 300 and tether 302, subsea vehicle 200 may be docked initially to TMS 300 and connected to tether 302. In such embodiments where subsea vehicle 200 is docked to TMS 300 and tether 302 via a tether connection, at a predetermined time, subsea vehicle 200 may be undocked from TMS 300 and transited to second subsea location 3a to perform a second predetermined task and re-docked to TMS 300 and disconnected from the tether 302 when the second predetermined task is completed or aborted.

In any of these embodiments the first predetermined task at the first predetermined field location 2 may comprise autonomously inspecting, surveying, and environmental monitoring of a field such as under controls sent to subsea vehicle 200 from a location such as ASV 110 or FPSO 120. In such embodiments, this may comprise establishing supervisory control from the launch location to subsea vehicle 200 via one or more wireless, wired, and/or acoustic communication links. Subsea vehicle 200 may be sent one or more commands to perform the autonomous inspection, survey and environmental monitoring of, e.g., first predetermined field location 2 while in transit.

Where the launch location comprises FPSO 120 and LARS 301, vehicle delivery system 100 and/or subsea vehicle 200 may be returned to FPSO 120.

Where vehicle delivery system 100 comprises ASV 110 to which subsea vehicle 200 is docked, ASV 110 may be deployed from the launch location, such as a shore location, and autonomously transit to first predetermined field location 2 and subsea vehicle 200 deployed once ASV 110 is at the predetermined location proximate first predetermined field location 2. Communications are established between ASV 110 and subsea vehicle 200 and one or more commands sent to subsea vehicle 200 to perform the first predetermined task at first predetermined subsea location 2a. Where subsea vehicle 200 comprises ROV 202 and system 1 further comprises tether management system TMS 300 to which ROV 202 is docked and tether 302 operatively connected to ROV 202, performing the predetermined task at the first predetermined field location 2 may further comprise commanding ROV 202 to perform a remote inspection and intervention control via commands issued from the launch location which may be transmitted at least in part through wireless communications and in part via tether 302.

At a predetermined time, e.g. when the first predetermined task is completed or aborted, subsea vehicle 200 may return to and dock with ASV 110. ASV 110 may then autonomously transit to second predetermined field location 3.

Where subsea vehicle 200 comprises AUV 201, the system 1 further comprises LARS 301 docked to vehicle delivery system 100, and AUV 201 is operatively connected to LARS 301, AUV 201 may be deployed from LARS 301 returned to first predetermined location 2 when the predetermined task at the first predetermined field location 2 is completed, at which time AUV 201 may be re-docked to ASV 110. As above, ASV 110 may then transit to second predetermined location 3, which may comprise a shore location or a next field location. ASV 110 may recharge its batteries and/or batteries on subsea vehicle 200 such as by using renewable energy source 102 and charging system 103 prior to autonomously transiting to second predetermined field location 3. ASV 110 may be commanded to perform a survey and environmental monitoring function in transit to its various predetermined field locations.

In these embodiments, system 1 may further comprise one or more aerial drones 600 which comprise a rechargeable energy source. If aerial drone 600 is present, data communication are established between the launch location and aerial drone 600 through wireless communications and aerial drone 600 deployed once ASV 110 has reached predetermined field location 2. Aerial drone 600 may then be used to perform a predetermined set of functions under control issued from the launch location and re-docked to ASV 110 when the predetermined set of functions is completed or aborted. Aerial drone 600 typically is allowed to recharge its rechargeable energy source when docked to ASV 110.

Where the launch location comprises FPSO 120, LARS 301 to which subsea vehicle 200 is docked, and vehicle delivery system 100 comprises ASV 110, ASV 110 may autonomously transit to first predetermined field location 2 where subsea vehicle 200 is deployed from LARS 301 to a location proximate first subsea field location 2a. Communications are established between ASV 110 and subsea vehicle 200 and subsea vehicle 200 sent one or more commands to perform the first predetermined task at first predetermined field location 2.

Where system 1 comprises TMS 300 to which subsea vehicle 200 is docked and tether 302 to which subsea vehicle 200 is operatively connected, subsea vehicle 200 is undocked from TMS 300 and to perform the predetermined task at the first predetermined field location 2.

As above, at a predetermined time, subsea vehicle 200 may returned to ASV 110 and re-docked to LARS 301. If LARS 301 further comprises a docking station and ASV 110 is deployed from FPSO 120 with such a LARS 301, one or more commands may be issued to request lowering of the docking station from ASV 110 and subsea vehicle 200 docked to TMS 300 and connected to tether 302. At a predetermined time, one or more further commands may be issued to undock subsea vehicle 200 from the TMS 300 to command subsea vehicle 200 to perform the predetermined task at the first predetermined field location 2 such as from FPSO 120 via wireless communications and tether 302. Once the predetermined task is completed or aborted, subsea vehicle 200 is typically commanded to return to the docketing station and, once there, commanding to disconnect from tether 302.

If returned to FPSO 120 such as upon completion or abortion of the predetermined task at the first predetermined field location 2, subsea vehicle 200 may be re-docked to FPSO 120 and allowed to recharge while docked at the FPSO 120, as described above. As also described above, subsea vehicle 200 may be transited to second predetermined field location 3 once recharged to perform a second predetermined task at second predetermined field location 3. As above, ASV 110 may then return to FPSO 120

In a further embodiment, vehicle delivery system 100 comprises LDUUV 203 and the launch location may comprise a shore location. In such embodiments, system 1 typically further comprises LARS 301. In such embodiments, LDUUV 203 autonomously transits to first predetermined field location 2 and LARS 301 used to aid in deploying subsea vehicle 200. In these embodiments, one or more communication buoy systems 400 may be deployed from LDUUV 203.

As in other embodiments, subsea vehicle 200 is typically sent one or more commands to have it re-dock to LDUUV 203 when its predetermined task is completed or aborted. These commands are typically issued from the launch location such as via wireless and/or acoustic communications.

In this embodiment, if subsea vehicle 200 comprises ROV 202 and system 1 further comprises TMS 300 and tether 302, ROV 202 is typically deployed using TMS 300 and the tether 302. As noted above, one or more communication buoy systems 400 may be deployed from the LDUUV 203 and one or more commands issued to effect control of ROV 202 from the launch location via wireless communications and tether 302.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A system for providing supervised control of a subsea vehicle for offshore asset management, comprising:
   a) a renewable energy source power generator;
   b) a charging system operatively in communication with the renewable energy source;
   c) a subsea vehicle;
   d) a vehicle delivery system, comprising a floating production storage and offloading platform and an autonomous surface vehicle, a large displacement unmanned underwater vehicle (LDUUV), and combinations thereof;
   e) a communication link; and
   f) a data transceiver operatively in communication with the subsea vehicle, the vehicle delivery system, and the communication link, the data transceiver adapted to relay data between the subsea vehicle and a remote location.

2. The system of claim 1, wherein the subsea vehicle comprises an autonomous underwater vehicle (AUV) or a remotely operated vehicle (ROV).

3. The system of claim 1, wherein the data comprise video data and control commands for subsea vehicle.

4. The system of claim 1, wherein the communication link comprises a cellular communication link or a satellite communication link.

5. The system of claim 1, wherein the renewable energy source power generator comprises a solar energy power generator or a wind generator.

6. The system of claim 1, wherein the renewable energy source power generator comprises a rechargeable battery.

7. The system of claim 6, wherein the charging system comprises a battery charging system.

8. The system of claim 7, wherein the battery charging system comprises an induction connection.

9. The system of claim 1, further comprising a tether management system (TMS).

10. The system of claim 9, wherein the TMS comprises a fiber optic tether and a fiber optic compatible, wet-mateable connector operatively in communication with the fiber optic tether.

11. The system of claim 1, further comprising an aerial drone.

12. A method for providing supervised control of a subsea vehicle for offshore asset management using a system for providing supervised control of a subsea vehicle for offshore asset management, comprising a renewable energy source power generator, a charging system operatively in communication with the renewable energy source, a subsea vehicle, a vehicle delivery system, a communication link, and a data transceiver operatively in communication with the subsea vehicle, the vehicle delivery system, and the communication link where the data transceiver is adapted to relay data between the subsea vehicle and a remote location, the method comprising:
   a) deploying the vehicle delivery system from a predetermined launch location, the vehicle delivery system comprising a floating production storage and offloading platform (FPSO) and an autonomous surface vehicle, a large displacement unmanned underwater vehicle (LDUUV), and combinations thereof;
   b) transiting the vehicle delivery system to a first predetermined field location;
   c) commanding the subsea vehicle to transit to a first subsea location proximate the first predetermined field location; and
   d) using the subsea vehicle to perform a first predetermined task at the first subsea location.

13. The method of claim 12 where the system further comprises a tether management system (TMS) and a tether, and where the subsea vehicle is initially docked to the TMS and connected to the tether, the method further comprising:
   a) docking the subsea vehicle to the TMS;
   b) connecting the subsea vehicle to the tether;
   c) at a predetermined time, undocking the subsea vehicle from the TMS and transiting the subsea vehicle to a second predetermined subsea location to perform a second predetermined task; and
   d) re-docking the subsea vehicle to the TMS and disconnecting the subsea vehicle from the tether when the second predetermined task is completed or aborted.

14. The method of claim 12, wherein the launch location comprises the FPSO and the system further comprises a launch and recovery system (LARS), the method further comprising returning the subsea vehicle to the FPSO.

15. The system of claim 2, wherein, if the subsea the vehicle delivery system further comprises an autonomous underwater vehicle (AUV), the system further comprises a launch and recovery system (LARS) adapted to interface with the AUV, the LARS configured to be launched from a deck on the vehicle delivery system or to be left moored close to the vehicle delivery system.

16. The system of claim 2, further comprising a moored floating, covered garage to which the autonomous subsea vehicle may be moored, the floating covered garage comprising communication hardware adapted to enable docking and undocking, protective storage, and diagnostics for the autonomous subsea vehicle and to act as a platform for vessel maintenance.

* * * * *